United States Patent [19]

Barrett

[11] Patent Number: 5,065,848
[45] Date of Patent: Nov. 19, 1991

[54] BRAKE-DISC-ROTOR ATTACHER IMPELLER (INTERSECTING/LOCKER)

[76] Inventor: David M. Barrett, P.O. Box 1693, Oklahoma City, Okla. 73101

[21] Appl. No.: 441,633

[22] Filed: Nov. 27, 1989

[51] Int. Cl.$^5$ ............................................ B60K 41/20
[52] U.S. Cl. ..................................... 192/1.36; 188/31
[58] Field of Search ................. 192/1.36, 1.4; 188/31, 188/69

[56] References Cited

U.S. PATENT DOCUMENTS

| | | | |
|---|---|---|---|
| 3,495,688 | 2/1970 | Isaacks | 188/31 |
| 3,763,674 | 8/1973 | Zahner | 70/226 |
| 3,830,330 | 8/1974 | Fontaine | 192/1.4 |
| 3,995,461 | 12/1976 | Hudson | 70/225 |
| 4,034,824 | 7/1977 | Lucas | 188/69 |
| 4,622,833 | 11/1986 | Shepherd | 70/226 |
| 4,629,043 | 12/1986 | Matsuo et al. | 192/1.36 |
| 4,667,783 | 5/1987 | Sugano et al. | 188/31 |

FOREIGN PATENT DOCUMENTS 48306  6/1983  Japan ................................ 192/1.36
823372  11/1959  United Kingdom ................ 188/31

Primary Examiner—Allan D. Herrmann
Assistant Examiner—Nicholas Whitelaw

[57] ABSTRACT

A vehicle road-wheel securing device comprising a structurally rigid latch (1) being positionable from its mounting (2) to a substantial portion of the vehicle by the direct and/or indirect effects of the activation of a solenoid unit (3) to effect an anchoring of the disc brake rotor (4) through intersection or the predisposed intersection of the latch by the influence of transfer spring (5) with the heat-sink recesses (6) of that disc brake's rotor to secure the position of the wheel therein involved. Further preferably providing an electromechanical timer circuit (7). While being charged through the operation of the vehicle's ignition switch, the electromechanical timer circuit provides for automatic solenoid activation at the termination of a specific timeframe from the point in time when the vehicle is shut off by the use of the ignition switch. Therein reversal of the solenoid's influence by the use of an override switch is facilitated.

16 Claims, 4 Drawing Sheets

BRAKE-DISC-ROTOR ATTACHER IMPELLER (INTERSECTING/LOCKER)

FIELD OF THE INVENTION

Vehicular anti-theft device which functions to secure a vehicle by securing one or more of the road-wheels of the vehicle by inhibiting the movement of one or more of the vehicle's disc brake rotors.

DESCRIPTION OF THE PRIOR ART

U.S. Pat. No. 4,622,833, Shepherd, Nov. 18, 1986, U.S. Pat. No. 3,763,674, Zahner Oct. 9, 1973, U.S. Pat. No. 3,995,461, Hudson, Dec. 7, 1976. To my knowledge the aforementioned patents constitute the Prior Art.

To my knowledge there is no wheel securing invention which:

(A) provides for the securing of a wheel by intersection of holes in that wheel's disc brake,
(B) that automatically functions (without operator action) to secure the vehicle by securing the position of the wheel,
(C) that, while being electrically operated, requires neither electric voltage nor electric current to maintain its function (activated or deactivated),
(D) which effects the insertion of a locking device for the securing of the vehicle irrespective of the positioning of the locking device in respect to its receptors,
(E) that, while being electrically operated cannot be circumvented by the removal of the power from the device, and
(F) that does not require the use of a key lock mechanism.

DESCRIPTION OF THE INVENTION

A mechanism designed to be externally attached or inbuilt within to a vehicle's disc brake which provides for the deployment of a rigid member into holes in a disc brake rotor so as to prevent the movement of the wheel which is involved with that brake. In the attached version a disc brake position-controlling mechanism which may be installed and operated without either necessitating the disruption of the disc brake mechanism or hampering the normal operation of the disc brake, a mechanism which could, in future manufacture, be constructed of as a component of the disc brake system.

Further providing an electronic, mechanical, manual, or hydraulic powered mechanism which by virtue of its components and their disposition constitute a mechanism with an either/or natural state of rest, such that there is no power required to maintain its activated or deactivated position. Further still, providing a remotely controlled, brake securing device which preferably utilizes the disc brake heat-sink recesses as the operative holes into which it deploys its rigid member.

In the simplest form, embodiment one, FIG. 1, the invention consists of a solenoid which is mounted to a disc brake caliper in such a position so as to point its drive rod toward the center of the disc brake rotor from the center of that rotor's edge surface. Further, this solenoid deploys a drive rod which is configured to be able to intersect the heat-sink recesses in the disc brake rotor. Therein movement of the wheel is prevented by the intersection of the solenoid's drive rod with the brake rotor through the unit's mounting on that brake's caliper.

Said solenoid is preferably powered by the vehicle's battery, at the option of the operator, through the use of an in-line power switch of the on/off variety.

The solenoid is simply mounted by the act of welding, fusing its metal case to the edge of the body of the brake caliper, which is also metal. That is to say, this solenoid body, as mounted, is intersected by and perpendicular to, at the point of contact, the arc of the circle as drawn by the exterior of the disc brake caliper housing.

Although the heretofore described embodiment provides the basic function of the invention, it displays limitations, weaknesses and shortcomings which this inventor considers to be impractical and/or incomplete; i.e., the rod of the solenoid would be, by wheel movement forces, attacked perpendicularly, therein receiving the full effect of any force to move the wheel. Therefore, the invention, to be limitly functional, would require a large and expensive structurally-rigid solenoid. Even such a large solenoid would yet be subject to distortion and malfunctions caused by the force effect of the sideways pressure upon its rod. The external portion of solenoid rods are supported through the length of the rod from the opposing end of that rod by the solenoid body and internal coil windings and as as a rule are not generally constructed to withstand sideways forces.

Therefore, this inventor has elected to provide the invention as depicted in the preferred embodiment (FIG. 2) with a separate structurally rigid pawl or latch. This pawl is positioned by its mounting to intersect the disc-brake rotor's heat-sink recesses. This pawl's intersection of the rotor's heat-sink recesses is accomplished through the functioning of the solenoid. Further, this inventor provides a pawl-configuration and a mounting assembly such as would transfer the majority of force applied from the disc rotor to that pawl's mounting structure in lieu of to the solenoid which deploys the pawl.

Further, the inventor provides the invention with a specific 'field-reversing or self-switching' solenoid or solenoid assembly. Preferably the invention is provided with a single field-reversing solenoid. This solenoid is deployed from a mounting on the body of the caliper unit of a vehicular disc brake. The action of this solenoid is initiated through power from the vehicle's battery. The drive of the solenoid's internal/external rod, when initially activated, physically contacts a pawl or latch-type of intersecting lock, so as to push the latch into the disc rotor. This pawl or latch-type of intersecting-lock is provided to the disc brake at the edge surface of the rotor. The intersecting end of the latch pawl is configured so as to be able to enter the rotor through the neat-sink slots of the rotor, therein to be maintained and to inhibit the movement of the rotor by its configuration and the rigidity deployed thereof.

When the pawl is in intersection with the rotor heat-sink, the forces for movement applied to the wheel are transferred. The forces are transferred through the configurational rigidity of the pawl to the physical rigidity of the pawl's mounting bracket, therein preventing movement of the wheel.

The special solenoid provides the invention with a further utility of allowing the device to remain in a functional position (in the pre-determined—engaged or disengaged—preset position). Such that, in the event that the unit's power source is removed, as in a burglar's attempt to circumvent the invention by cutting its power wires or by removal of the battery from the system, the invention is still in operation.

The inventor has developed the function of this special solenoid in order to provide a control unit that is electrically at rest at either end of its throw. This provision is made so as to eliminate the need for electric voltage or current when the device is either completely activated or completely deactivated. NOTE: Barring the feasibility of constructing or obtaining the envisioned variety of solenoid, the inventor will utilize a dual solenoid or a pair of solenoids, operating in reverse directions to each other. Said solenoid unit would be provided with end limit locks and switches so as to provide the desired function and characteristics of operation of the herein described preferable embodiment of the invention.

Obviously this invention facilitates itself to the use of the electrical solenoid or any other reversible power application device (i.e., hydraulic pumps or electric motors) such as would push the pawl's latch end into one of the heat-sink recesses of the disc and such as would be capable of electively removing said latch thereafter. In the preferred embodiment the inventor has selected solenoid use for the convenience of both physical size and remote control-ability as well as its electro-physical adaptability to the special auxiliary benefits of equipment override switches, indication lights, etc., which are provided to this invention.

DESCRIPTION OF THE OPERATION

Neither of these direct solenoid variations (inbuilt or attached) of the invention are considered as preferable by the inventor because: (a) Both of the aforementioned provide that the solenoid body be perpendicular to (and therefore also somewhat radiantly outward of) the caliper body which produces (considering the current state of the art of solenoids) a physical height radiantly outward of the caliper body which is limiting to the range of application of the device. Many vehicles are constructed such that there is very little clearance between the caliper body and the vehicle's wheel and tire and steering/shock mechanisms. (b) The direct use of a solenoid, unless this solenoid is spring-mounted (which is considered as another embodiment of the invention because it is herewithin described), will not provide for the preferred characteristic of "pressured toward intersection" such as is deemed beneficial to the invention in order to provide for the occurrence of the rotor's position being such that the solenoid rod would strike a rotor wall section in lieu of directly penetrating a heat-sink recess. The wall section is the part of the rotor which is between the heat-sink recesses.

Further, the inventor perceives the use of hydraulics or air pressure/vacuum mechanisms as a means of control of the intersecting rod—especially in versions which would incorporate holes in the disc brake caliper body as rod guides as an embodiment which would relieve the physical area constraints. Again, the inventor does not, at this time, consider such to be the preferred embodiment because: (a) the complexity and cost of support mechanism required for such an embodiment are extreme; (b) the fallability of pressure/vacuum systems, due to pressure leaks, impairs dependability; and (c) the support mechanism for such pressure/vacuum systems (i.e., a vacuum tank and hoses) provide accessibility and vulnerability to sabotage, of the system, during an attempt to circumvent the device for purposes of theft.

Further still, both of the above mentioned embodiments display (considering the state of the art of such devices) a drawback to consumer usage. That is, the force-receiving part (the part subject to requiring most frequent replacement) is an integral part of the system in lieu of being a separate, detachable, and easily-replaceable, cost-effective component. This is a situation which this inventor considers impractical.

DESCRIPTION OF THE OPERATION

In the preferred embodiment (FIG. 2) the device's pawl (8) in the deactivated position of rest, is not within a heat-sink (see FIG. 5) of the disc brake rotor (see FIG. 5), but is maintained poised in position to be thusly inserted.

The electrical operational components and the sequence of the electrical circuit passive mode operation are as follows:

During the running of the vehicle's engine a timer capacitor is charged through contacts with the engine's ignition circuit (or through the auxiliary circuits of the ignition key). When the engine is cut off, by means of the key, the capacitor is permitted to discharge through a resistive timer circuit. (Said timer preferably being at least 30 seconds in duration for safety sake and not more than three minutes for the sake of functionality of the unit.) Expiration of the timer activates the timer switch which causes a voltage to be applied to the solenoid (1) which pushes the basic drive rod (3) causing it to impose a pushing force through spring (9) which is contained in collar restraint (10) upon the secondary drive rod (4) through its physical connection with the pawl body (8) which pushes the pawl to pivot about its axle mount (5) into pawl end insertion within a brake rotor heat-sink slot (see FIG. 5).

In the event that the latch end of the pawl body (8) strikes a heat-sink section separator therein preventing insertion of the latch into a heat-sink recess: solenoid (1) extends drive rod (3) to compress spring (9) within its retaining collar (10) to tend to push secondary drive rod (4) which maintains tension on pawl (8) until either the disc is rotated, therein physically permitting the insertion of pawl-latch end into the first available heat-sink (see FIG. 5); or, the unit is electively deactivated through the electrical control (as previously described) by the operator.

SUMMARY OF THE INVENTION

The invention consists of of a rigid pawl or latch-type rod which is pivotable or deployable from a rigid mounting to engage the heat-sink recesses of the disc brake through the provision of a powering mechanism and a mounting mechanism.

In the simpliest form, the invention consists of a solenoid which is mounted to a disc brake caliper in such a position so as to point toward the center of the rotor from the center of it's edge surface. Further, this solenoid deployes a drive rod which is configured to be able to intersect the heat-sinc gaps in the disc brake rotor to prevent the movement of the wheel which is connected to that brake hub.

Further, the inventor provides the device with a separately mounted pivotable paul which is positioned by the activation of the solenoid. Further, this inventor provides a paul-shape such as would transfer the majority of any force applied to that paul to it's mounting structure in lieu of to the solenoid which deployes the pawl.

When the paul is in intersection with the disc heat-sinc, all forces for movement applied to the wheel are transferred to the physical rigidity of the pauls mounting bracket therein preventing movement of the wheel.

Further still, there is provided a field reversing solenoid or a solenoid unit capable of acting as the solenoid unit described.

Further yet, there is a spring member which acts to establish the potental for the insertion of this device's lock pawl in the event that the pawl should not be exactly positioned for entry to the disk brake rotor at the time of activation.

Additionally, there is an activation circuit which is preferably an automatic timer circuit this circuit would preferably activate the device when the engine has been stopped for a peroid of time.

Figure 1:
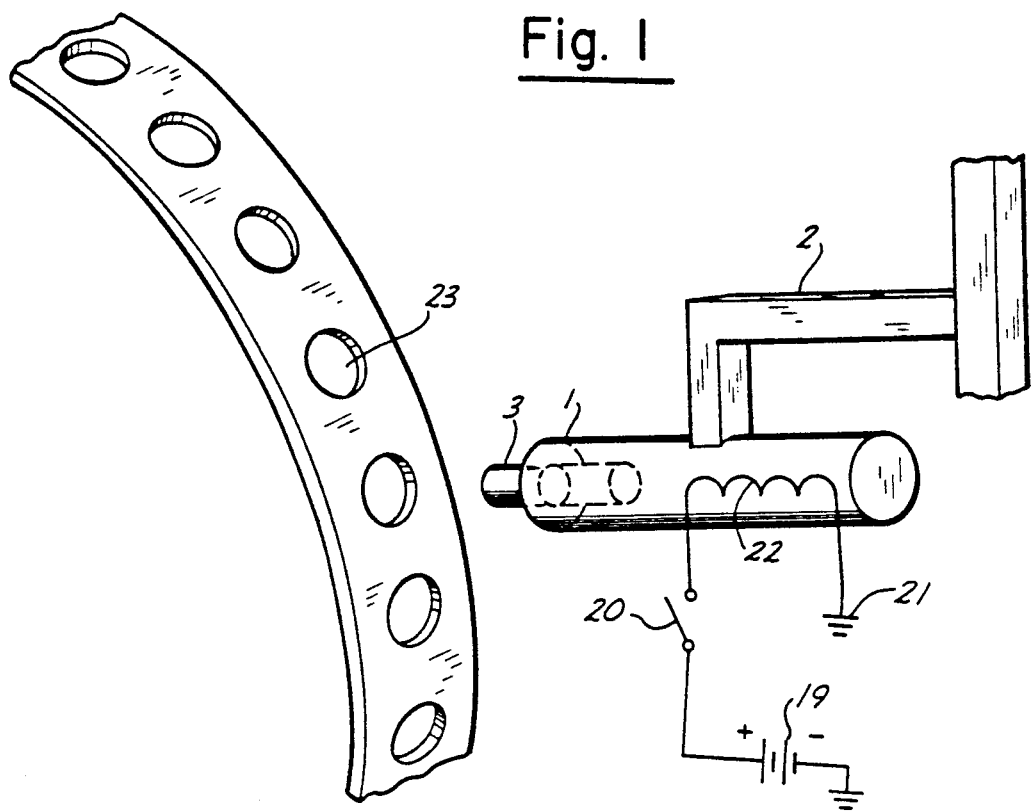
FIG. 1 depicts a solenoid (1) (with mounting) in a position to deploy its drive rod (3) into a hole in a wheel (23). This figure also depicts the simplest election of a circuit for the operation of this unit: battery (19) switch (20) ground (21) coil (22)
Figure 2:
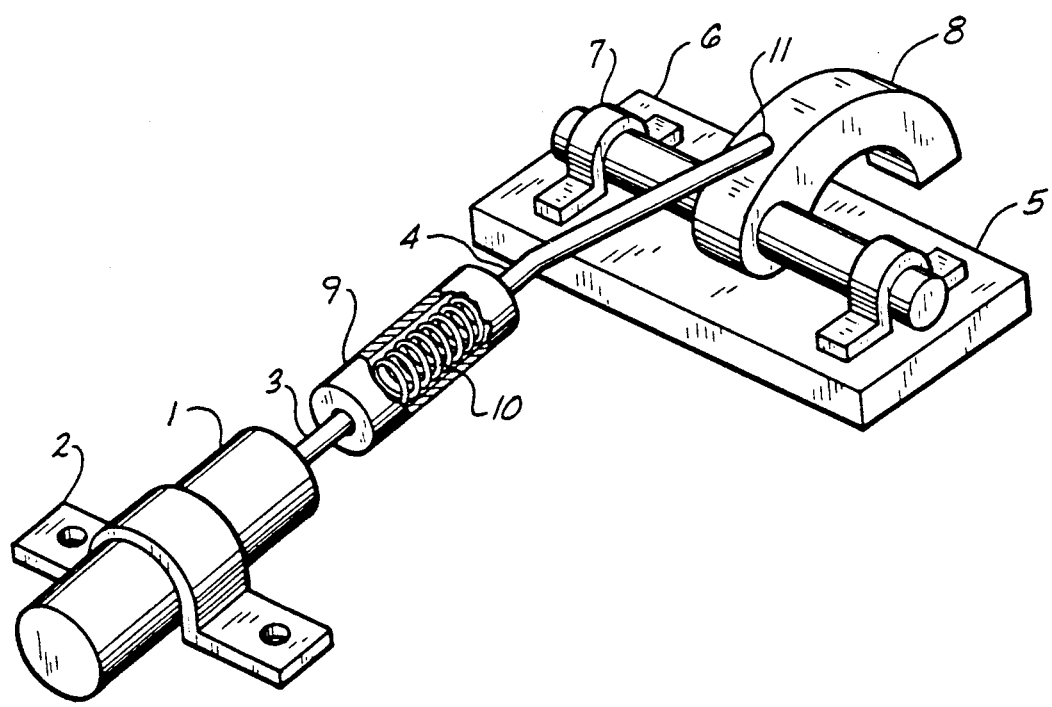
FIG. 2
Number 1 is the solenoid
Number 2 is the solenoid mounting bracket
Number 3 is the solenoid's drive rod
Number 4 is the secondary drive rod
Number 5 is the mounting plate
Number 6 is the pawl axle
Number 7 is the axle mounting bracket
Number 8 is the pawl (or latch)
Number 9 is a compression spring
Number 10 is the spring/rod collar (retainer)
Number 11 is a pivotable connection FIG. 3
Number 1 is a pull-type solenoid
Number 2 are the power connections
Number 3 is the solenoid drive rod
Number 4 is the secondary drive rod
Number 5 is a "T" contacting extension
Number 6 is a mounting bracket
Number 7 is a mounting post
Number 8 is a pawl or latch
Number 9 is a compression spring
Number 10 is a pivotable mounting post
Number 11 is a tension spring
Number 12 is a heat-sink recess
Number 13 is a disc brake rotor
Number 14 is the disc brake caliper body
Number 15 is a spring retaining collar
Number 16 is the latch end
Number 17 is the section between the heat-sink recess
Figure 3:
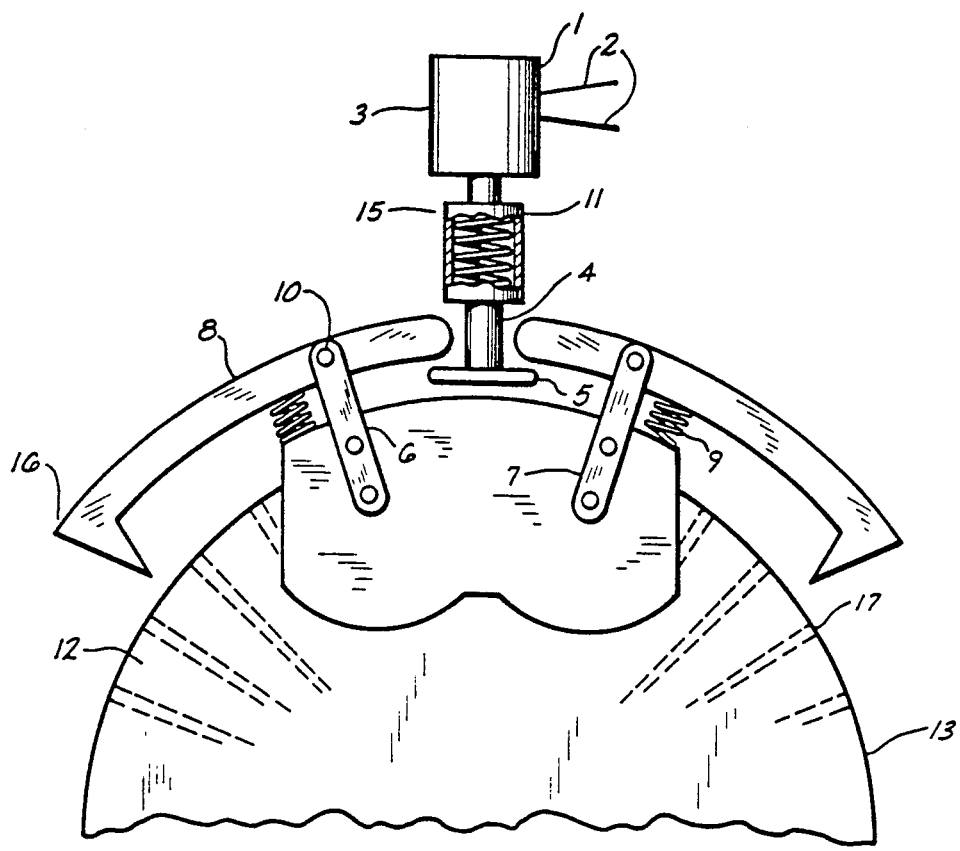
Figure 4:
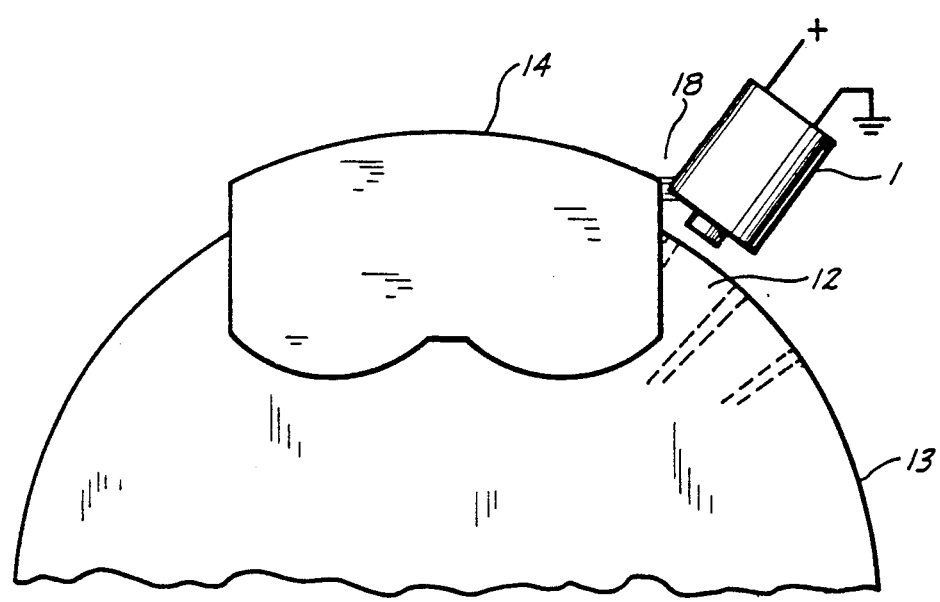
FIG. 4 depicts the general positioning of the solenoid (1) in relation to the caliper (14) and the heat-sink recess (12) of a disc brake rotor (13) with a weld mounting (18) as per the basic principals of the invention.
Figure 5:
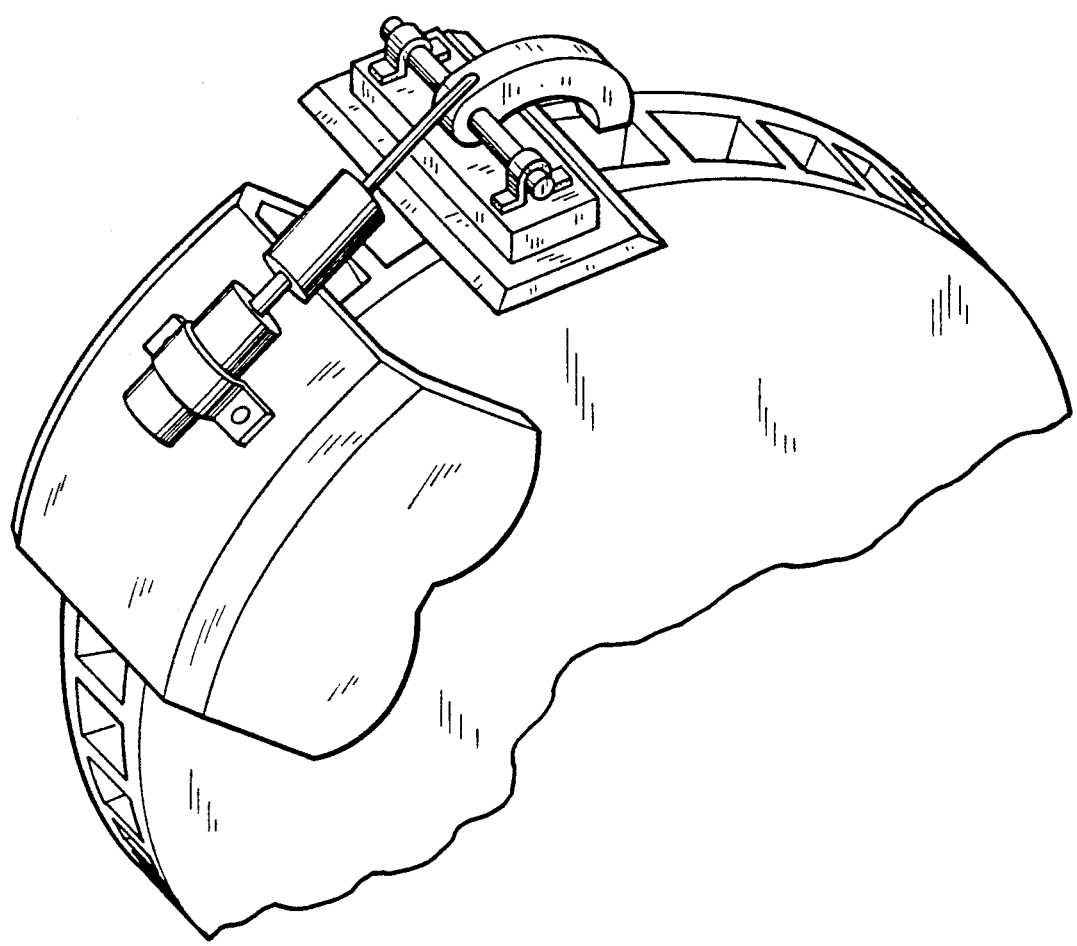
FIG. 5 depicts the preferable embodiment and its positioning on a disk caliper and in reference to the rotor.
Figure 6:
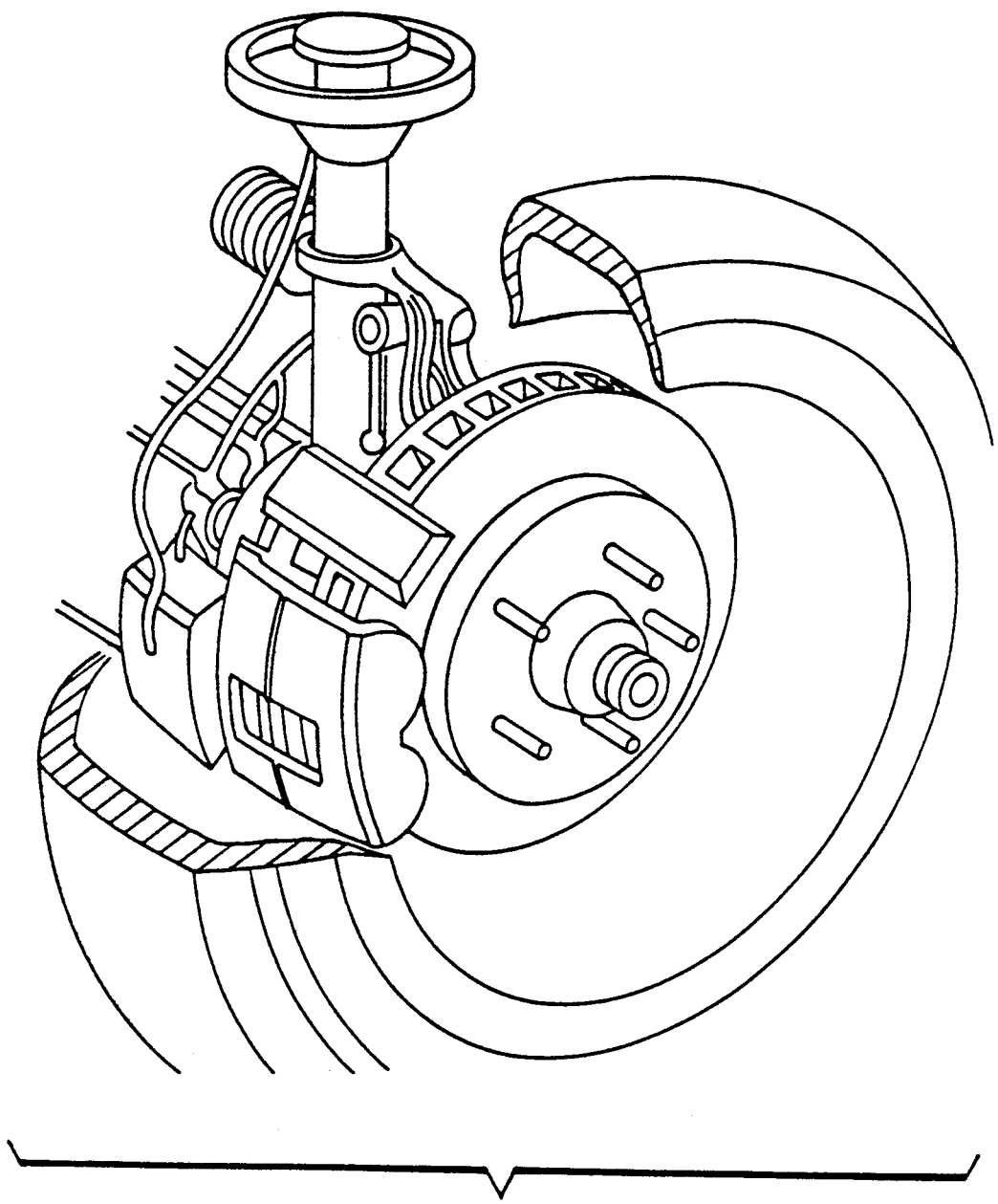
FIG. 6 the positioning and size of a disc brake unit in relation to the cut away of the tire and wheel, for better understanding of the interim steps required to develop the preferred embodiment.

In a device for securing the position of a wheeled vehicle which is equipped with the disc brakes by the securing of one or more of the disc brake rotors against movement, and which further provides the facility for, or is equipped to provide enhanced benefits of security to the vehicle and convenience to the owner and/or operator, I claim:

1. A device for securing a wheeled vehicle which is equipped with disk brakes and disk brake rotors by securing one or more of the disk brake rotors against movement, and for providing enhanced benefits of security to the vehicle and convenience to an owner of the vehicle, said device comprising:

one or more pawls capable of being inserted into heat-sink recesses of said one or more disk brake rotors;

deploying means for deploying said one or more pawls into a deployed position intersecting one or more of the heat-sink recesses of said one or more disk brake rotors;

controlling means for controlling selective positioning of said one or more pawls in the intersection of, or removal from, said heat sink recesses of said one or more disk brake rotors;

mounting means for mounting the device in the appropriate position with respect to one or more said disk brakes;

whereby the vehicle securing device does not interfere with the operation of the vehicle by a legitimate operation and functions without requiring action on the part of a legitimate operator to secure the vehicle from being moved by securing the position of one or more ground contacting tires through said one or more pawls intersecting said one or more heat-sink recesses and thus locking said one or more disk brakes.

2. A device according to claim 1 in which the deploying means is an electrical solenoid.

3. A device according to claim 2 in which the controlling means is a single pole single-throw switch connected in line with an electric power source to the solenoid of the controlling means.

4. A device according to claim 2 in which the solenoid is provided with a metallic case.

5. A device according to claim 2 in which: The electric solenoid unit is a dual function solenoid which is electrically at rest at either end of its throw with an end position switch for current reversal activation; such that after being positioned by electric power said unit will not require continued electric power to maintain position.

6. A device according to claim 1 in which the mounting means is provided by fusing of the solenoid's case to a disk caliper body of one or more said disk brakes.

7. A device according to claim 1 in which: the deploying means further comprises in sequence:

an electrical solenoid with a first drive rod located in said solenoid;

a compression spring mounted on the end of said first the drive rod which protrudes from the solenoid;

a spring retention collar surrounding the spring and connecting the first drive rod to a second drive rod;

a pivotable connection joining the second drive rod to one of said one or more pawls;

said one or more pawls being pivotally mounted on a separate pivot so that said one or more pawls may engage or disengage one of said one or more disk brake rotors.

8. A device according to claim 1 in which: said one or more pawls is a curved structural unit with a C-shaped flat metallic piece engaging said one or more disk brake rotors at one end, while having a hole permeating the other end to receive a pivotable mounting rod.

9. A device according to claim 8 in which: said one or more pawls is further provided with an attachment means for the attachment of the deploying means, which is placed on the curve of said one or more pawls between the hole for said pivotable mounting rod and the one end which engages said one or more disk brake rotors.

10. A device according to claim 1 in which: the mounting means further comprises a pillow block type of axle housing with an axle capable of passing through an axle hole in said one or more pawls in a snugly fit fashion so as to provide for rotational pivotability of said one or more pawls.

11. A device according to claim 10 in which: the mounting means further comprises a solenoid mounting bracket of a strap-down type.

12. A device according to claim 1 in which: the controlling means further comprises in sequence:
one or more electrical solenoids in a unit which are controlled by:
an override switch with pawl withdrawing ability;
an activation circuit comprising a timer-type switch which selectively engages the solenoid unit; and
wiring from the unit to both the vehicle's battery and to the vehicle's ignition switch.

13. A device according to claim 12 in which;
said activation circuit is an automatic circuit comprising in sequence:
a slow charge capacitor, which charges as the vehicle runs and which is set to discharge across a resistive-inductive timer switch when the ignition switch is turned off;
the resistive-inductance timer switch is activated by the aforementioned capacitor and at the end of its time period engages the unit;
an override switch, which disengages the unit and;
wiring to the vehicle's battery, solenoid, ignition switch, and the override switch which functions to cause said intersecting of said one or more pawls after the vehicle's engine is stopped.

14. A device according to claim 1 in which:
the deploying means is comprised of a pair of electrical solenoids working in reverse conjunction with one another so as to provide maintenance of the deployed position irrespective of the removal of the voltage which initiated the position.

15. A vehicular securing device in a vehicle with an ignition and a lawful operator and a wheel brake mechanism fixed to a wheel which in turn is mounted on a ground contacting tire, said device comprising:
a solenoid mounted to the vehicle which when activated moves a drive rod into a hole in a rotatable portion of the wheel brake mechanism;
solenoid activation means which are predisposed by the normal operation of the vehicle for causing engagement of the drive rod after the vehicle has been stopped by shutting off the vehicle's ignition without requiring any other action of the lawful operator;
separate electrical control means for permitting the lawful operator to disengage said drive rod to free said vehicle to the lawful operator's usage.

16. In a vehicle wheel lock; a wheel having a member rotatably with the wheel and providing an opening, said vehicle having a stationary portion adjacent to said wheel, a solenoid having a stem, a retaining arm on one end of said stem adapted to be inserted through and removed from said opening with said stem extending closely fitting in said opening and control electric components directly interconnected with the solenoid to provide automatic engagement when the vehicle is, by ignition shut-off, stopped and which is releasable by use of an elected remote release, to provide an anti-theft device which secures the wheel to said stationary portion and holding said wheel against rotation.

* * * * *